(12) United States Patent
Scott et al.

(10) Patent No.: US 9,919,226 B2
(45) Date of Patent: Mar. 20, 2018

(54) STORAGE AND CHARGING DEVICE FOR GAME PIECES

(71) Applicant: Microsoft Technology Licensing, LLC, Redmond, WA (US)

(72) Inventors: James William Scott, Cambridge (GB); Haiyan Zhang, London (GB); Nicolas Villar, Cambridge (GB); Alexandra Keeley Bunting, London (GB); Jonathan Leslie Venables, London (GB); Simon Jay Carter, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 557 days.

(21) Appl. No.: 14/509,862

(22) Filed: Oct. 8, 2014

(65) Prior Publication Data

US 2016/0101364 A1 Apr. 14, 2016

(51) Int. Cl.
*G06T 17/00* (2006.01)
*A63F 13/95* (2014.01)
*A63F 13/23* (2014.01)
*A63F 13/825* (2014.01)
*A63F 13/822* (2014.01)
*A63F 13/31* (2014.01)
*A63F 13/323* (2014.01)
*A63F 13/98* (2014.01)
(Continued)

(52) U.S. Cl.
CPC ............ *A63F 13/95* (2014.09); *A63F 13/214* (2014.09); *A63F 13/23* (2014.09); *A63F 13/31* (2014.09); *A63F 13/323* (2014.09); *A63F 13/822* (2014.09); *A63F 13/825* (2014.09); *A63F 13/98* (2014.09); *A63F 3/00643* (2013.01)

(58) Field of Classification Search
None
See application file for complete search history.

(56) References Cited

U.S. PATENT DOCUMENTS 6,149,490 A 11/2000 Hampton et al.
6,159,101 A 12/2000 Simpson
(Continued)

FOREIGN PATENT DOCUMENTS

WO 2001012285 A1 2/2001
WO 2001069799 A2 9/2001
(Continued)

OTHER PUBLICATIONS

"International Preliminary Report on Patentability Issued in PCT Application No. PCT/US2015/054103," dated Jul. 21, 2016, 5 pages.
(Continued)

*Primary Examiner* — Lawrence Galka
(74) *Attorney, Agent, or Firm* — Klarquist Sparkman, LLP

(57) ABSTRACT

A storage and charging device for game pieces is described which is associated with an interactive software experience, such that the storage and charging device corresponds to a virtual entity within the interactive software experience. The storage and charging device comprises a charging mechanism and a communication mechanism. The charging mechanism is arranged to charge at least one of the game pieces and the communication mechanism is arranged to communicate with the interactive software experience.

34 Claims, 10 Drawing Sheets

(51) Int. Cl.
*A63F 13/214* (2014.01)
*A63F 3/00* (2006.01)

(56) References Cited

U.S. PATENT DOCUMENTS

| | | | |
|---|---|---|---|
| 6,290,565 | B1 | 9/2001 | Galyean, III et al. |
| 6,305,688 | B1 | 10/2001 | Waroway |
| 6,454,624 | B1 | 9/2002 | Duff et al. |
| 6,572,431 | B1 | 6/2003 | Maa |
| 6,575,802 | B2 | 6/2003 | Yim et al. |
| 6,682,392 | B2 | 1/2004 | Chan |
| 6,773,322 | B2 | 8/2004 | Gabai et al. |
| 6,773,344 | B1 | 8/2004 | Gabai et al. |
| 6,954,659 | B2 | 10/2005 | Tushinsky et al. |
| 7,154,363 | B2 | 12/2006 | Hunts |
| 7,439,972 | B2 | 10/2008 | Timcenko |
| 7,641,476 | B2 | 1/2010 | Didur et al. |
| 7,695,338 | B2 | 4/2010 | Dooley et al. |
| 7,749,089 | B1 | 6/2010 | Briggs et al. |
| 8,058,837 | B2 | 11/2011 | Beers et al. |
| 8,079,846 | B1 | 12/2011 | Cookson |
| 8,087,939 | B2 | 1/2012 | Rohrbach et al. |
| 8,157,611 | B2 | 4/2012 | Zheng |
| 8,228,202 | B2 | 7/2012 | Buchner et al. |
| 8,257,157 | B2 | 9/2012 | Polchin |
| 8,317,566 | B2 | 11/2012 | Ganz |
| 8,332,544 | B1 | 12/2012 | Ralls et al. |
| 8,475,275 | B2 | 7/2013 | Weston et al. |
| 8,548,819 | B2 | 10/2013 | Chan et al. |
| 2002/0196250 | A1* | 12/2002 | Anderson ............... G06T 19/00 345/420 |
| 2005/0132290 | A1 | 6/2005 | Buchner et al. |
| 2007/0097832 | A1 | 5/2007 | Koivisto et al. |
| 2007/0198117 | A1 | 8/2007 | Wajihuddin |
| 2007/0218988 | A1 | 9/2007 | Lucich |
| 2008/0153559 | A1* | 6/2008 | de Weerd ............... A63F 3/04 463/9 |
| 2009/0008875 | A1* | 1/2009 | Wu ........................ A63F 9/10 273/153 S |
| 2009/0029771 | A1 | 1/2009 | Donahue |
| 2009/0047865 | A1 | 2/2009 | Nakano |
| 2009/0081923 | A1 | 3/2009 | Dooley et al. |
| 2009/0206548 | A1 | 8/2009 | Hawkins et al. |
| 2009/0291764 | A1 | 11/2009 | Kirkman et al. |
| 2009/0307592 | A1 | 12/2009 | Kalanithi et al. |
| 2010/0113148 | A1 | 5/2010 | Haltovsky et al. |
| 2010/0167623 | A1 | 7/2010 | Eyzaguirre et al. |
| 2011/0021109 | A1 | 1/2011 | Le et al. |
| 2012/0007817 | A1 | 1/2012 | Heatherly et al. |
| 2012/0050198 | A1 | 3/2012 | Cannon |
| 2012/0052931 | A1 | 3/2012 | Jaqua et al. |
| 2012/0052934 | A1 | 3/2012 | Maharbiz et al. |
| 2012/0122059 | A1 | 5/2012 | Schweikardt et al. |
| 2012/0190453 | A1 | 7/2012 | Skaff et al. |
| 2012/0286629 | A1 | 11/2012 | Johnson et al. |
| 2013/0109267 | A1 | 5/2013 | Schweikardt et al. |
| 2013/0109272 | A1 | 5/2013 | Rindlisbacher |
| 2013/0122753 | A1 | 5/2013 | Blakborn |
| 2013/0165223 | A1 | 6/2013 | Leyland et al. |
| 2013/0173658 | A1 | 7/2013 | Adelman et al. |
| 2013/0196766 | A1 | 8/2013 | Leyland et al. |
| 2013/0196770 | A1 | 8/2013 | Barney et al. |
| 2013/0231193 | A1* | 9/2013 | Heatherly ............... A63H 3/28 463/42 |
| 2013/0288563 | A1 | 10/2013 | Zheng et al. |
| 2014/0213357 | A1 | 7/2014 | Claffey |

FOREIGN PATENT DOCUMENTS

| | | |
|---|---|---|
| WO | 2001069829 A2 | 9/2001 |
| WO | 2009037679 A1 | 3/2009 |
| WO | 2012160055 A1 | 11/2012 |

OTHER PUBLICATIONS

PCT Search Report and Written Opinion dated Feb. 1, 2016 for PCT Application No. PCT/US15/54103, 12 pages.
Schweikardt, Eric, "Designing Modular Robots", Nov. 19, 2013, Available at: http://www.cmu.edu/architecture/research/grad_work/2009_phdcd_schweikardt_eric.pdf.
"Skylanders Swapforce", Sep. 11, 2013, Available at: http://www.skylanders.com/swapforce.
"Disney Infinity", Nov. 19, 2013, Available at: https://infinity.disney.com/en-gb.
"Cubelets", Sep. 11, 2013, Available at: http://www.modrobotics.com/.
"Shapeways", Nov. 19, 2013, Available at: http://shapeways.com/.
Lampe, et al., "The Augmented Knight's Castle—Integrating Mobile and Pervasive Computing Technologies into Traditional Toy Environments", Nov. 21, 2013, Available at: http://www.vs.inf.ethz.ch/publ/papers/mlampe-pg07-akc.pdf.
Kikin-Gil, Ruth, "BuddyBeads", Published on: Oct. 10, 2006, Available at: https://www.ruthkikin.com/Images/r.kikin-gil_thesis2005.pdf.
Fortmann, et al., "Illumee: Aesthetic Light Bracelet as a Wearable Information Display for Everyday Life", In Proceedings of ACM Conference on Pervasive and Ubiquitous Computing Adjunct Publication, Sep. 8, 2013, 4 pages.
Labrune, et al., "Telebeads: Social Network Mnemonics for Teenagers", In Proceedings of Conference on Interaction Design and Children, Jun. 7, 2006, 8 pages.
Ahde, et al., "Hello—Bracelets Communicating Nearby Presence of Friends", In Proceedings of the Tenth Anniversary Conference on Participatory Design, Sep. 30, 2008, 3 pages.
Kuniavsky, Mike, "Smart Things: Ubiquitous Computing User Experience Design", Published on: Sep. 2010, Available at: http://books.google.co.in/books?id=-WLyUCBBUVAC&pg=PA89&lpg=PA89&dq=Interactive+Smart+Beads+and+Bracelet&source=bl&ots=HA6ZA1Bssz&sig=x1s2X1pGZIe-5oVqX3uZA0jZ1ks&hl=en&sa=X&ei=BxWLUqSGI4X3rQfh9oDYCg&ved=0CFAQ6AEwBg#v=onepage&q=Interactive%20Smart%20Beads%20and%20Bracelet&f=false.
Robertson, Judy, "Encouraging Girls to Study Geeky Subjects (Part 2): Programmable Bracelets", Published on: Apr. 12, 2010, Available at: http://cacm.acm.org/blogs/blog-cacm/85132-encouraging-girls-to-study-geeky-subjects-part-2-programmable-bracelets/fulltext.
Lampe, et al., "Integrating Interactive Learning Experiences into Augmented Toy Environments", In Proceedings of the Pervasive Learning Workshop at the Pervasive Conference, May 2007, 8 pages.
"Seebo Platform", Published on: Jun. 22, 2013, Available at: http://www.seebo.com/.
Raffle, et al., "Topobo: A Constructive Assembly System with Kinetic Memory", In Proceedings of the SIGCHI Conference on Human Factors in Computing Systems, Apr. 24, 2004.
Schmid, et al., "Networking Smart Toys with Wireless ToyBridge and ToyTalk", In IEEE International Conference on Computer Communications, Apr. 10, 2011, 2 pages.
Patrizia, et al., "A Robotic Toy for Children with special needs: From requirements to Design", In IEEE 11th International Conference on Rehabilitation Robotics, Nov. 20, 2013, 6 pages.
Zaino, Jennifer, "JNFC Technology Brings New Life to Games", In Journal of RFID, Oct. 1, 2012, 10 pages.
U.S. Appl. No. 14/203,991, Zhang, et al., "Generation of Custom Modular Objects", filed Mar. 11, 2014.
U.S. Appl. No. 14/204,239, Zhang, et al., "Gaming System for Modular Toys", filed Mar. 11, 2014.
U.S. Appl. No. 14/204,483, Saul, et al., "Interactive Smart Beads", filed Mar. 11, 2014.
U.S. Appl. No. 14/204,740, Saul, et al., "A Modular Construction for Interacting with Software", filed Mar. 11, 2014.
U.S. Appl. No. 14/204,929, Zhang, et al., "Storing State for Physical Modular Toys", filed Mar. 11, 2014.
U.S. Appl. No. 14/205,077, Zhang, et al., "Data Store for a Modular Assembly System", filed Mar. 11, 2014.

(56) References Cited

OTHER PUBLICATIONS

"Disney Infinity", Published on: Aug. 25, 2013, Available at: http://www.essentialkids.com.au/entertaining-kids/games-and-technology/disney-infinity-20130823-2sgg0.html.

Marshall, Rick, "Skylanders: Swap Force Review" Published on: Nov. 1, 2013, Available at: http://www.digitaltrends.com/game-reviews/skylanders-swap-force-review/.

Jennings, et al., "CONSTRUCT/VizM: A Framework for Rendering Tangible constructions", In Proceedings of the 14th Congress of the Iberoamerican Society of Digital Graphics, Nov. 17, 2010, 4 pages.

Kitamura, et al., "Real-time 3D Interaction with ActiveCube", In Proceedings of Extended Abstracts on Human Factors in Computing Systems, Mar. 31, 2001, 2 pages.

"Siftables are Changing the Shape of Computing", Published on: May 9, 2010, Available at http://singularityhub.com/2010/05/05/siftables-are-changing-the-shape-of-computing/.

'Cuff—fashion wearable bracelets', 2014 Available at: http://www.elle.com/_mobile/news/fashion-accessories/cufflinc-wearable-techsrc=spr_TWITTER&spr_id=1448_51714286&linkId=7882609.

'Prodigy—Kickstarter', 2014 Available at: https://www.kickstarter.com/projects/121511007/prodigy-the-game.

CONSTRUKTS—Part time UI/UX and Engineer Positions, 2014 Available at: http://www.construkts.com.

"Proxi In-Device Charging Solution", Retrieved on: May 19, 2013, Available at: http://powerbyproxi.com/consumer-electronics/industrial/proxi-in-device-charging-solution/.

Webster, Andrew, "Nex Band is a Smart, Modular Charm Bracelet for Gaming on Your Wrist", Published on: Feb. 13, 2014, Available at: http://www.theverge.com/2014/2/13/5289404/nex-band-is-a-smart-modular-charm-bracelet.

Wu, Yingying, "Customizable Wristband Sensor for Healthcare Monitoring 24/7", Published on: Nov. 14, 2013, Available at: http://marblar.com/idea/493o7.

Betters, Elyse, "LeapFrog LeapBand is an Activity Band for Kids with Virtual Pet Capabilities", Published on: May 1, 2014, Available at: https://uk.news.yahoo.com/leapfrog-leapband-activity-band-kids-virtual-pet-capabilities-231500937.html#PQ8QOQq.

Persson, Markus, "Minecraft", May 27, 2014, Available at: https://minecraft.net/game.

"World of Warcraft Crafting" Skills, May 27, 2014, Available at: http://us.battle.net/wow/en/.

Kelly, Samantha Murphy, "The Reinvented Tamagotchi: Bright, Flashy and Just as Needy", Feb. 20, 2014, Available at: http://mashable.com/2014/02/20/tamagotchi-friends/.

* cited by examiner

STORAGE AND CHARGING DEVICE FOR GAME PIECES

BACKGROUND

There are many ways that a user can interact with a computer game and typically a user controls the game via a keyboard and mouse, games controller (which may be handheld or detect body movement) or touch screen, dependent upon the platform on which the game is being played (e.g. computer, games console or handheld device). A number of games have also been developed in which gameplay is enabled (or unlocked) through the use of physical character toys which are placed on a custom base connected to a games console. By placing different toys on the custom base, different gameplay is enabled. The custom base may provide power to the toys when they are placed on to the base.

The embodiments described below are not limited to implementations which solve any or all of the disadvantages of known gaming hardware.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A storage and charging device for game pieces is described which is associated with an interactive software experience, such that the storage and charging device corresponds to a virtual entity within the interactive software experience. The storage and charging device comprises a charging mechanism and a communication mechanism. The charging mechanism is arranged to charge at least one of the game pieces and the communication mechanism is arranged to communicate with the interactive software experience.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
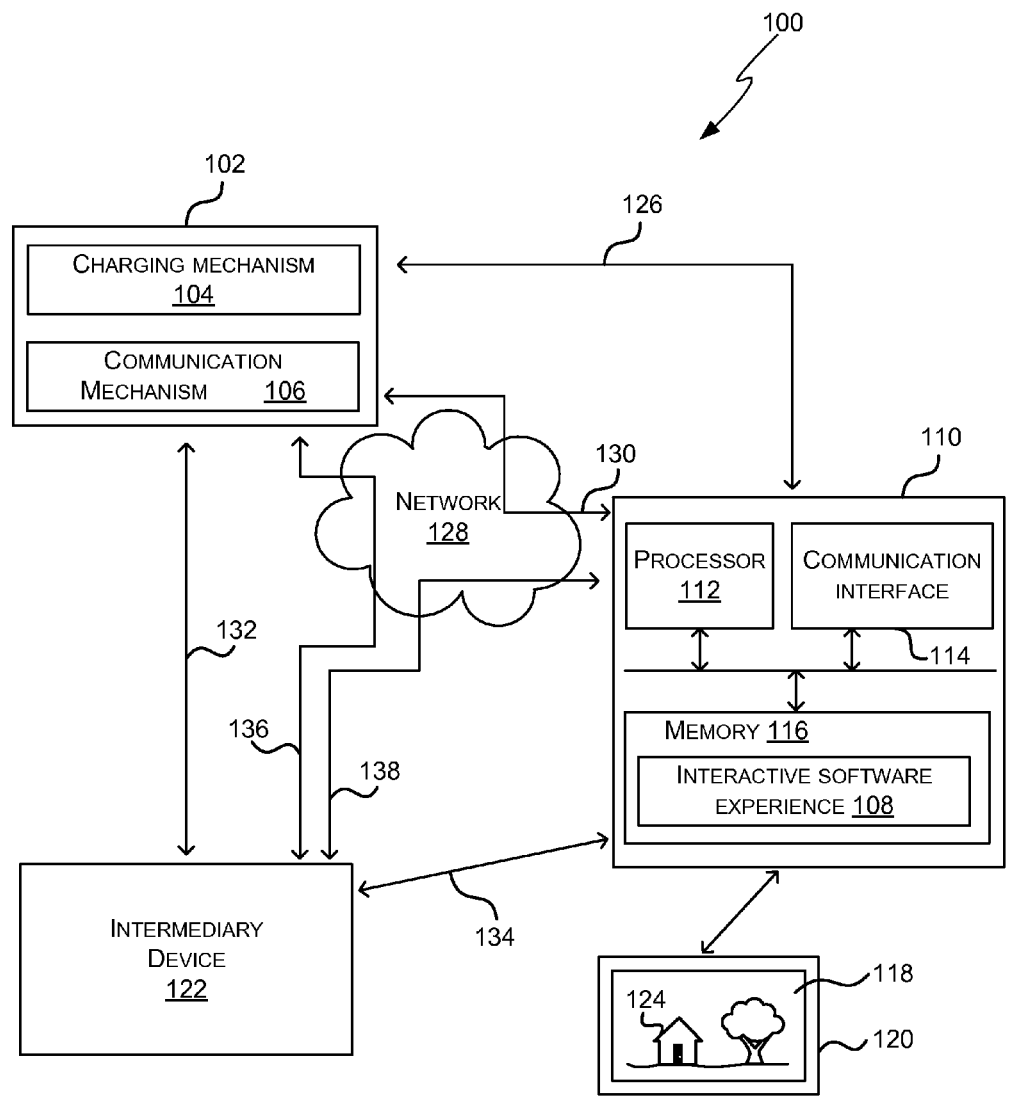
FIG. 1 is a schematic diagram of an example system comprising an example storage and charging device.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

A storage and charging device for game pieces is described below. The game pieces are associated with an interactive software experience (i.e. they affect the operation of the interactive software experience and/or correspond to a virtual entity, or part thereof, within the interactive software experience) and the storage and charging device corresponds to (i.e. is represented by) a virtual entity within the interactive software experience. For example, the storage and charging device may correspond to a virtual building, vehicle, location, container, etc. within the interactive software experience and a game piece may correspond to a virtual character, object or part thereof within the same interactive software experience. The interactive software experience may be a game, social media application, personal organization application (e.g. which enables one or more users to set out a family/work schedule through physical tokens in the form of modules which represent particular tasks), multimedia application (e.g. which allows a user to compose photographs and music represented by physical tokens in the form of modules into a slideshow/movie for sharing), etc.

The storage and charging device comprises a communication mechanism (or module) arranged to communicate with the interactive software experience either directly (e.g. via a network) or via an intermediary device (e.g. via a handheld computing device such as a smartphone, desktop or tablet computer or games console, or via one of the game pieces). In various examples, the storage and charging device may communicate an identifier (ID) of one or more game pieces which are in/on the storage and charging device and/or the ID of the storage and charging device itself to the interactive software experience. In some examples, the storage and charging device may also communicate other data, such as data which is stored within a game piece and/or the storage and charging device.

The storage and charging device further comprises a charging mechanism (or module) arranged to charge one or more game pieces, for example, when in or on the storage and charging device. The term 'charging' is used herein to refer to the process of increasing the amount of stored energy in a battery (or other energy storage device) within a game piece, where this stored energy is used subsequently to operate the game piece and this is distinct from the term 'powering' which is used herein to refer to the process of providing energy to a game piece which is then used substantially immediately (i.e. without being first stored for more than a very short period of time) to operate the device. The charging may be wired or wireless charging. Where wired charging is used, a game piece may be connected to the storage and charging device. Where wireless charging is used, a game piece may not be connected to the storage and charging device and instead may be in, on, under, adjacent to, against or otherwise proximate to the storage and charging device.

In various examples, one or more (or all) of the game pieces are wearable devices or part thereof. For example, the game pieces may comprise one or more smart beads and a band (or connecting element) to which the smart beads can be attached. The storage and charging device may be adapted to store one or more smart beads and one or more bands and the charging mechanism may be arranged to charge the band(s) and/or the smart bead(s). The term 'smart bead' is used herein to refer to an object which can be attached to (e.g. threaded onto) a connecting element (e.g. to form a bracelet or necklace) and which comprises a storage element arranged to store data relating to the bead (e.g. an ID for the bead).

FIG. 1 is a schematic diagram of an example system 100 comprising an example storage and charging device 102. The storage and charging device 102 comprises a charging mechanism 104 and a communication mechanism 104. The charging mechanism (or module) 104 is arranged to charge one or more game pieces (e.g. when located in/on the storage and charging device) and the communication mechanism (or module) 106 is arranged to communicate with an interactive software experience 108. The interactive software experience 108 (which may be a computer game) runs on a separate computing device 110.

The storage and charging device 102 may have any physical form factor and in various examples it may be shaped like a box or other container such that the game pieces are placed inside it. In other examples, the storage and charging device 102 may be shaped such that game pieces are placed on or hung from it. In further examples, the storage and charging device 102 may be shaped such that game pieces are placed beside/against it (e.g. so that they are touching the storage and charging device 102). In the following description any reference to a game piece being in/or on the storage and charging device is by way of example only and in other examples a game piece may be placed in any position such that it can be charged by the charging mechanism.

The separate computing device 110, which may be a personal computing device (e.g. computer, tablet, smartphone, games console, handheld/mobile computing device, etc.) or a shared computing device (e.g. a server located in a data center), may comprise a processor 112, a communication interface 114 (for receiving messages from the storage and charging device 102) and a memory 116 in which the computer-executable instructions for the interactive software experience 108 are stored. The interactive software experience 108 provides a user interface (UI). The UI may be a graphical user interface (GUI) 118 which is rendered on or by a display device 120, an audio-only user interface which is played via a speaker or headphones, or any other form of UI. The display device 120 (or speaker/headphones) may be part of (i.e. integrated within) the computing device 110 or co-located with that computing device 110 (e.g. as a peripheral device). Alternatively, the display device 120 (or speaker/headphones) may be remote from the computing device 110 and may, for example, be part of, or connected to, a further computing device (e.g. a user's smartphone, desktop or tablet computer, games console, intermediary device 122, etc.). In some examples, the GUI may be rendered on the display device (e.g. where the display device is a display screen, such as an LCD display) and in other examples, the GUI may not be rendered on a display but may be projected by the display device onto a surface (e.g. where the display device is a projector).

The processor 112 may be a microprocessor, controller or any other suitable type of processor for processing computer executable instruction to control the operation of the computing device 110 in order to run the interactive software experience 108. In some examples, for example where a system on a chip architecture is used, the processor 112 may include one or more fixed function blocks (also referred to as accelerators) which implement a part of the method of running the interactive software experience 106 in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system or any other suitable platform software may be provided at the computing device 110 to enable application software, such as the interactive software experience 108 to be executed on the device. The computer executable instructions (including the computer executable instructions for the interactive software experience 108) may be provided using any computer-readable media that is accessible by computing device 110. Computer-readable media may include, for example, computer storage media such as memory 116 and communications media. Computer storage media, such as memory 130, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 116) is shown within the computing device 110 it will be appreciated that the storage may be distributed or located remotely and accessed via a network 128 or other communication link (e.g. using communication interface 114).

The computing device 110 may also comprise an input/output controller arranged to output display information to the display device 120 (and/or an audio device such as a speaker or headphones) which, as described above, may be separate from or integral to the computing device 110. The display information provides the GUI 118 for the interactive software experience. In various examples where the display device 120 is part of (or connected to) a separate computing device (and is not integral to or a peripheral of computing device 110), the display information may alternatively be transmitted via the communication interface 114. The input/output controller may also be arranged to receive and process input from one or more devices, such as a user input device (e.g. a mouse, keyboard, camera, microphone or other sensor). In some examples the user input device may detect voice input, user gestures or other user actions and may provide a natural user interface (NUI). This user input may be used to provide inputs to the interactive software experience 108. In an embodiment the display device 120 may also act as the user input device if it is a touch sensitive display device. The input/output controller, where provided, may also output data to other devices (e.g. to an audio device instead of a display device 120).

It will be appreciated that inputs to the interactive software experience 108 may also be received via the communication interface 114. For example, where the display device 120 is remote from the computing device 110 and is part of, or connected to, another computing device (e.g. intermediary device 122), inputs may be made by a user via a user input device which is part of, or connected to, that other computing device and the input commands may be communicated from that computing device to the computing device 110 running the interactive software experience 108 via the communication interface 114. In various examples, inputs may be made by the user via the storage and charging device 102.

Any of the input/output controller, display device 120 and the user input device may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The storage and charging device 102 is associated with the interactive software experience 108 in that it corresponds to a virtual entity 124 within the interactive software experience 108. In the example shown in FIG. 1 this virtual entity 124 is visible within the GUI 118; however, in other examples the virtual entity which corresponds to the storage and charging device 102 may not be visible within the GUI (or non-graphical UI) or may only sometimes be visible within the GUI. In various examples, the storage and charging device described herein may be shaped such that it resembles the virtual entity to which it corresponds and in various examples, it may be possible to change the appearance of the storage and charging device (e.g. as described in more detail with reference to FIG. 7). For example, the storage and charging device may resemble a castle, boat, dolls house, workshop, palace, super-hero lair, vehicle, etc. Such an object may be represented visually within the GUI, in sound within an audio-only UI, etc.

The charging mechanism (or module) 104 is arranged to charge a battery (or other energy storage device) within a game piece located within the storage and charging device 102 and at any time, the charging mechanism 104 may charge one or more game pieces (or no game pieces if there are none in/on the storage and charging device). Any suitable charging mechanism may be used and in various examples there may be a physical electrical contact between the charging mechanism 104 and a game piece (e.g. using a plug and socket arrangement or other arrangement which uses a continuous electrical conductor). In other examples, wireless charging (e.g. inductive charging) may be used with the charging mechanism 104 comprising one or more coils which inductively couple power to one or more coils in one or more game pieces. Various charging arrangements are described in more detail below with reference to FIG. 5. In various examples, the charging mechanism 104 may further be arranged to both charge and power a game piece which is located in/on the storage and charging device or to charge one or more game pieces and to power one or more other game pieces.

The charging mechanism 104 may be arranged to charge all the game pieces which are in/on the storage and charging device or the charging mechanism may charge only some of the game pieces. In various examples, there may be particular locations within or on the storage and charging devices where charging does not occur and/or the charging mechanism 104 may selectively charge game pieces (e.g. under the control of a control module). The selection of which game pieces to charge may be dependent upon one or more parameters such as user input, input from the interactive software experience, battery status of the battery(s) in the piece(s), etc.

The communication mechanism 106 may communicate with the interactive software experience 108 (via communication interface 114) via a direct connection to the separate computing device 110 (arrow 126), via a network 128 (arrow 130) or via an intermediary device 122 (arrow 132/136 and arrow 134/138) and various examples are described below with reference to FIG. 2. The intermediary device 122 may be a personal computing device (such as smartphone, desktop or tablet computer, handheld or mobile computing device, or games console) or a shared computing device (e.g. a wireless access point, router, server, etc.) or a game piece. In various examples, the communication mechanism 106 may communicate with the interactive software experience 108 via multiple intermediary devices 122 and/or multiple networks 128.

Figure 2:
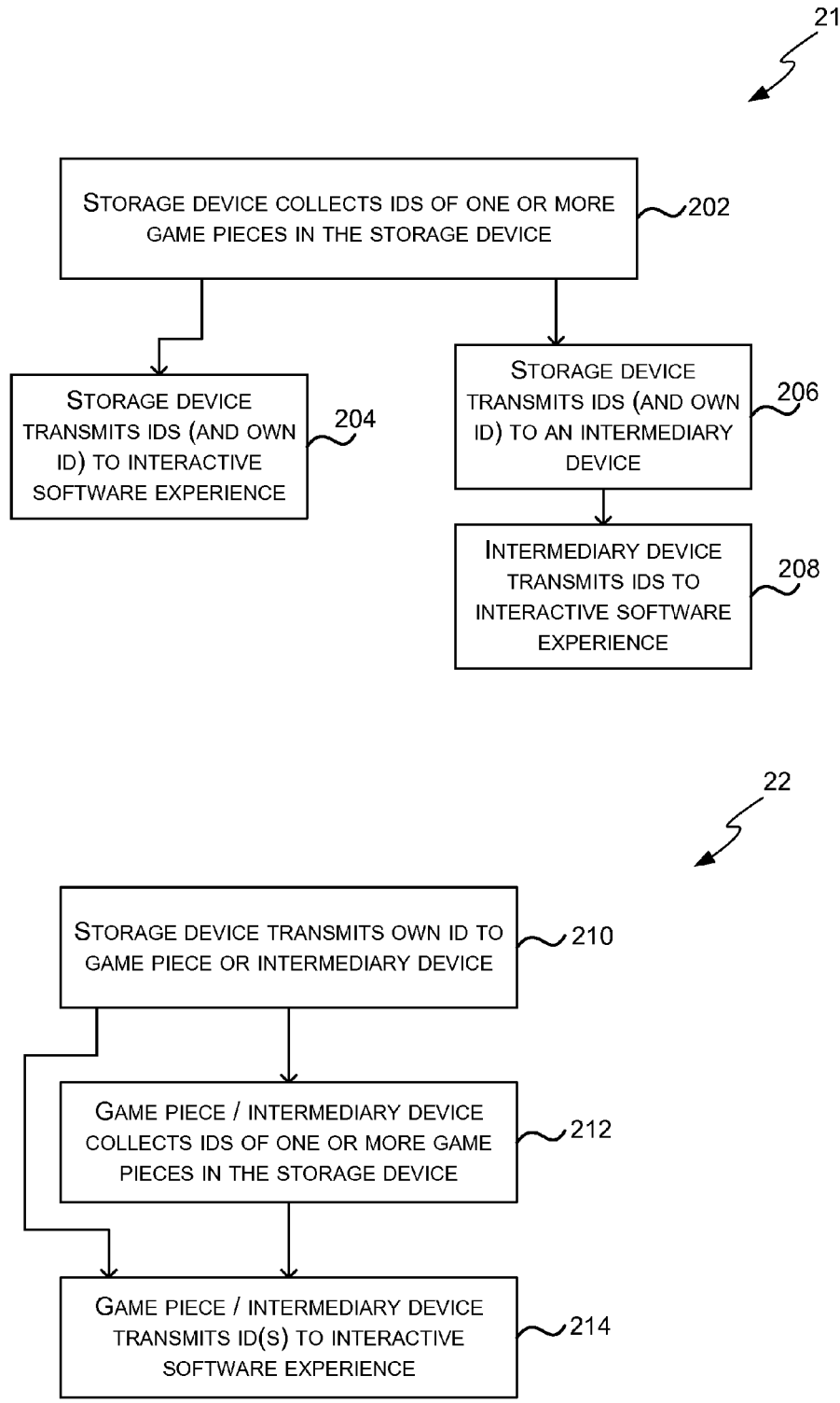
FIG. 2 shows various example methods of operation of a storage and charging device.

FIG. 2 shows various example methods by which the communication mechanism 106 in the storage and charging device 102 communicates with the interactive software experience 108. In a first example, as shown in flow diagram 21, the storage and charging device 102 connects to the interactive software experience 108 directly (arrow 126 or 130). In this example, the storage and charging device 102 comprises an ID collection module which collects the IDs of one or more game pieces which are in/on the storage and charging device (block 202). The storage and charging device then transmits these collected IDs to the interactive software experience (block 204) either via a direct link to the computing device 110 running the interactive software experience (arrow 126) or via a network (arrow 130). In various examples, the storage and charging device 102 transmits its own ID as well as the IDs of game pieces that it has collected (in block 204).

In a second example, also shown in flow diagram 21, the storage and charging device 102 collects the IDs of one or more game pieces that are in/on the storage and charging device (block 202) and then transmits them (either directly or via a network) to an intermediary device 122 (block 206 and arrow 132 or 136). As in the first example, the storage and charging device 102 may transmit its own ID as well as the IDs of game pieces that it has collected (in block 206). The intermediary device 122 then transmits the IDs received to the interactive software experience (block 208 and arrow 134 or 138).

In a third example, as shown in flow diagram 22, instead of the storage and charging device collecting the IDs of game pieces which are in/on the storage and charging device, the IDs of the game pieces and the storage and charging device are collected by another entity (block 212), referred to as the collecting entity, which may be a game piece or the intermediary device 122. The storage and charging device 102 transmits its own ID to the collecting entity (block 210 and arrow 132 or 136) so that it can then be transmitted by the collecting entity (game piece or intermediary device 122) to the interactive software experience (block 214 and arrow 134 or 138) along with any other IDs that have been collected.

In a fourth example, also shown in flow diagram 22, there is no collection of IDs (block 212 is omitted) and instead, the storage and charging device 102 transmits its own ID to a game piece or the intermediary device 122 (block 210 and arrow 132 or 136) and the receiving entity (the game piece or the intermediary device 122) then transmits the storage device's ID to the interactive software experience (block 214 and arrow 134 or 138) without collecting any other IDs.

Although FIG. 2 only shows the transmission of IDs to the interactive software experience (in blocks 204, 208 and 214), in various examples, additional data may also be transmitted (e.g. by the storage and charging device 102 in block 202 or 210). This additional data, for example, be position data (e.g. data identifying where in/on the storage and charging device a game piece is located), orientation data (e.g. data describing orientation of the game piece when in/on the storage and charging device), other data about a game piece (e.g. which may be stored on the game piece and transmitted by the game piece to the storage and charging device 102/intermediary device 122/interactive software experience 108), etc. In examples where position and/or orientation data is transmitted by the storage and charging device 102 to the interactive software experience, the storage and charging device 102 may comprise one or more sensors for detecting the position and/or orientation of a games piece within or on the storage and charging device 102. In various examples, where the storage and charging device 102 comprises sensors and/or user inputs, the additional data which is transmitted (e.g. in block 202 or 210) may comprise sensor and/or user input data.

The data which is stored on a game piece and which may be transmitted to the interactive software experience (e.g. by the storage and charging device) may, for example, include one or more of:
  Game data, such as:
    a 2D/3D representation of the game piece which can be used within the GUI of the interactive software experience to represent the game piece (e.g. a 3D model, image and/or texture map)
    audio snippets or text associated with that game piece
    a mini-game which is enabled within an interactive software experience as a result of using the game piece or a particular combination (e.g. set) of game pieces
  Configuration data, such as:
    An identifier (ID) for the game piece
    Manufacture date
    Manufacturer
    Game piece type
    Details of any sets of game pieces that the game piece may belong to
  State data, such as
    a total real world time in use or number of total uses
    recent history of use
    physical state information for the game piece (e.g. physical failure states such as an indicator that a sensor has failed, battery levels, etc.)
    details of use with other game pieces (e.g. IDs of other game pieces that it has been used with, details of sets of game pieces which have been used together with the game piece, etc.)
    details of the other game pieces with which the game piece has interacted
    details of where in the world the game piece has been used, and of other game pieces that were also present in such locations (and other users that were present)
  Details of the owner of the game piece, which may comprise only the current owner or details of the ownership history
  Permissions granted by the owner, e.g. permissions for their "friends" using a social network (e.g. Xbox LIVE®) to borrow the game piece
  A price associated with the game piece, e.g. a "for sale" price that a friend can pay to buy the game piece (which may be expressed in real currencies or virtual currencies/points systems), or past history of prices/transactions involving that game piece
  Where/when/from whom the game piece was bought or how it was acquired (e.g. won as a prize in a game competition).

Similarly, the data which is stored on the storage and charging device itself and which may be transmitted to the interactive software experience may, for example, include one or more of:
  Game data, such as:
    a 2D/3D representation of the storage and charging device which can be used within the GUI of the interactive software experience to represent the storage and charging device (e.g. a 3D model, image and/or texture map)
    audio snippets or text associated with that storage and charging device
    a mini-game which is enabled within an interactive software experience as a result of using the storage and charging device or of placing a particular combination (e.g. set) of game pieces in the storage and charging device
  Configuration data, such as:
    An identifier (ID) for the storage and charging device
    Manufacture date
    Manufacturer
    Storage and charging device type
  State data, such as
    a total real world time in use or number of total uses
    recent history of use (e.g. IDs of game pieces which have been stored in the storage and charging device in the recent past)

physical state information for the storage and charging device (e.g. physical failure states such as an indicator that a sensor has failed, battery levels, etc.)

details of where in the world the storage and charging device has been used, and of game pieces that were in the storage and charging device at each location Details of the owner of the storage and charging device, which may comprise only the current owner or details of the ownership history.

The communication mechanism 106 may use any suitable communication technology to communicate with a game piece, intermediary device and/or computing device running the interactive software experience (e.g. selected based on the required range and/or power consumption). Examples of communication technologies which may be used include Near Field Communication (NFC), Bluetooth®, Bluetooth® Low Energy (BLE), WiFi™ or WiFi™ Direct, 802.15.4, etc. Where the storage and charging device 102 communicates with both a proximate game piece and a more distant intermediary device, the communication mechanism 106 may use the same or a different communication technology for communicating with the game piece and the intermediary device.

In response to receiving the IDs of the game pieces which are in/on the storage device 102 (as transmitted in blocks 204, 208 and 214 of FIG. 2), the interactive software experience changes its operation, as described in more detail below with reference to FIG. 10. This may involve changing the GUI or other form of UI, updating the status of virtual entities associated with the received IDs, etc. An example can be described with reference to FIG. 3.

Figure 3:
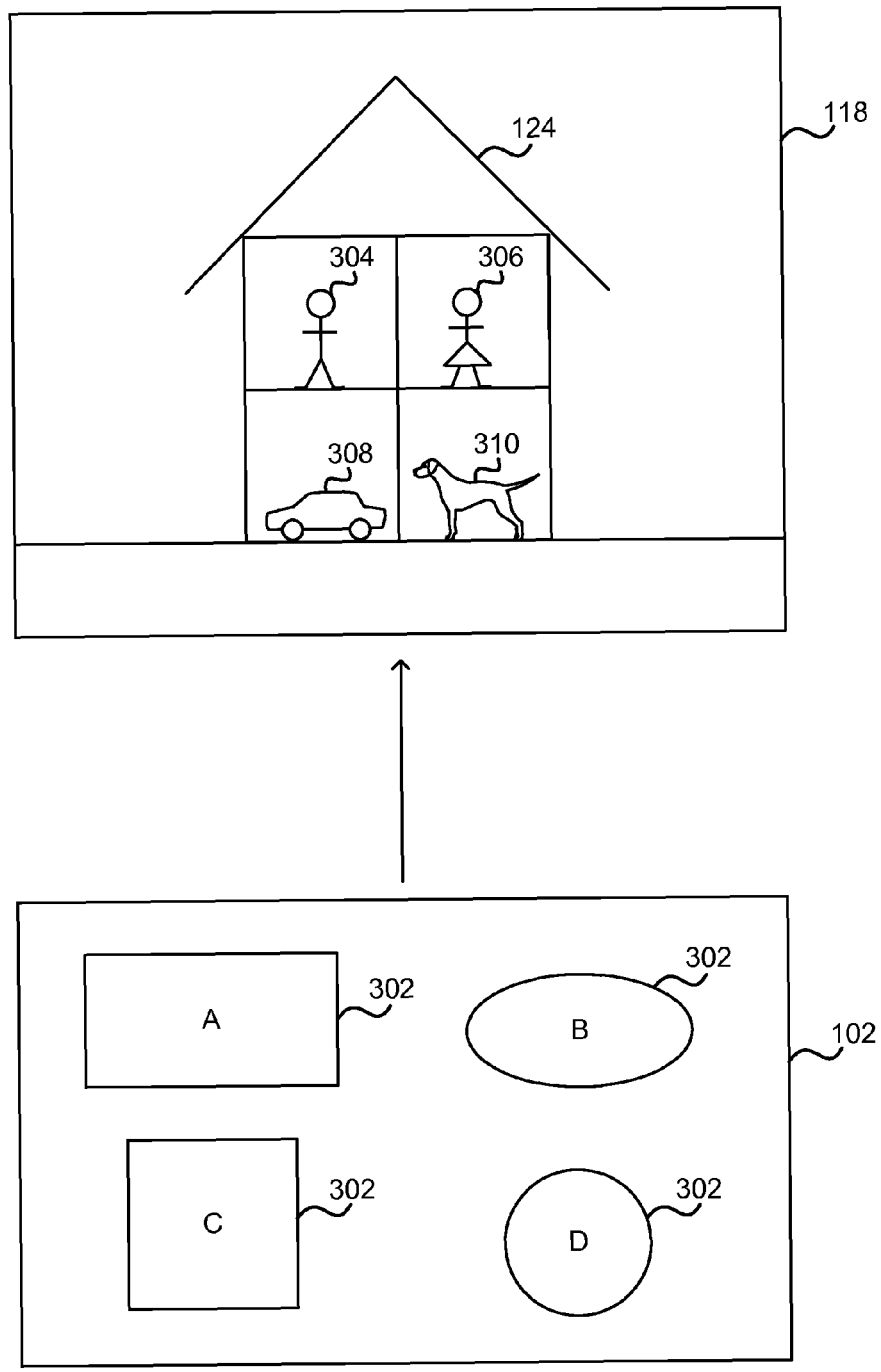
FIG. 3 shows a schematic diagram of an example storage and charging device with four game pieces located in it and an example graphical user interface for a corresponding interactive software experience.

FIG. 3 shows a schematic diagram of an example storage and charging device 102 with four game pieces 302 (denoted A-D) located in it and an example GUI 118 for the interactive software experience. The GUI 118 shows a virtual entity 124 which corresponds to the storage and charging device 102 and in response to receiving data indicating that game pieces A-D are in the storage and charging device 102 (e.g. in response to receiving the IDs of game pieces A-D linked to the ID of the storage and charging device 102), virtual entities 304-310 associated with the game pieces A-D are shown inside the virtual entity 124 corresponding to the storage and charging device 102. In the example shown in FIG. 3, the position of the virtual entities 304-310 corresponding to the game pieces A-D in the virtual entity 124 corresponding to the storage device 102 is based on the position (or the relative position) of the game pieces 302 within the storage device 102; however in other examples there may be no determination of position or relative position within the storage and charging device 102 and/or any determined position or relative position may not be used when placing virtual entities within the interactive software experience.

As shown in FIG. 3, when a game piece is in/on the storage and charging device 102, the game piece and the storage and charging device are associated with the same interactive software experience. In various examples, the game piece may be associated with a different interactive software experience when it is not in/on the storage and charging device. This may, for example, enable a user to move a character/object from a first interactive software experience to a second interactive software experience by placing the game piece corresponding to the character/object into/onto the storage and charging device associated with the second interactive software experience.

In various examples, a user may place one or more game pieces anywhere within or on the storage and charging device; however in other examples, the storage and charging device may comprise a locating mechanism which defines positions where game pieces are to be placed in/on/around the storage and charging device by a user. The locating mechanism may, for example, comprise recesses and/or protrusions (e.g. hooks, pegs or pedestals) to receive game pieces. In other examples an aligning (or alignment) mechanism may be provided instead of a locating mechanism. The aligning mechanism does not place restrictions on where a user can place a game piece in the storage and charging device but when activated aligns the game pieces (e.g. using magnets) into a predefined orientation.

Figure 4:
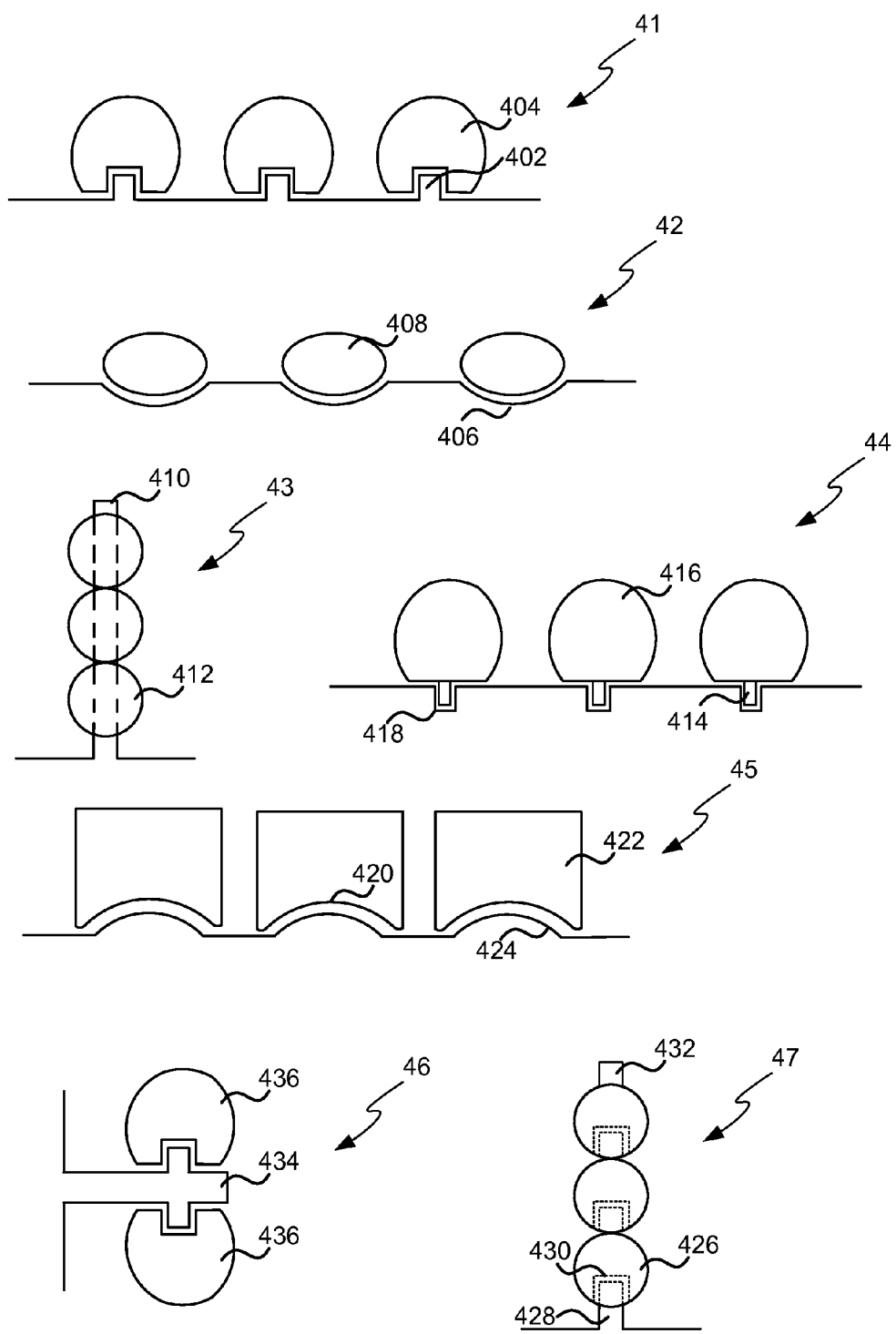
FIG. 4 shows schematic diagrams of various locating mechanisms within a storage and charging device.

Various examples of locating mechanisms are shown in FIG. 4, although it will be appreciated that in various examples other arrangements of recesses/protrusions may be used. In the first example 41, the locating mechanism comprises a plurality of pegs 402 onto which game pieces 404 with a corresponding recess or aperture can be fitted. In the second example 42, the locating mechanism comprises a plurality of recesses 406 into which game pieces 408 can be placed (or may self-locate when placed into the storage and charging device). In various examples, the recesses 406 may be shaped so that they fit the game pieces and where a storage and charging device is arranged to store game pieces of different shapes/sizes, the recesses 406 may be of different shapes/sizes. In a third example 43, the locating mechanism comprises a post 410 only to which a plurality of game pieces 412 with a corresponding aperture can be placed.

The fourth example 44, could be considered to be the inverse of the first example 41, with the pegs 414 being located on the game pieces 416 and the locating mechanism of the storage and charging device comprising corresponding recesses/apertures 418. Similarly, the fifth example 45 could be considered to be the inverse of the second example 42, with the recesses 420 being located in the game pieces 422 and the locating mechanism comprising corresponding protrusions 424. The sixth example 46 shows a second arrangement in which game pieces 426 are stacked on top of each other. Unlike the third example 43 where multiple game pieces 412 are mounted on the same post 410, in the sixth example 46, the locating mechanism comprises a peg 428 onto which a game piece 426 with a corresponding recess 430 can be fitted. The game piece 426 comprises a matching peg 432 onto which a further game piece 426 with a corresponding recess 430 can be fitted.

The seventh example 47 shows a locating mechanism which comprises a protrusion 434 which is shaped to receive two game pieces 436 with corresponding recesses/apertures. Where two game pieces are attached to the same protrusion 434 (as in FIG. 4), this may be reflected within the interactive software experience (e.g. by displaying a virtual entity which is formed from a combination of the virtual entities associated with each of the game pieces which are attached to the protrusion).

As described above, a locating mechanism in a storage and charging device can comprise any combination of the pegs, recesses and/or posts shown in any of the examples of FIG. 4 (e.g. any of the examples may be combined with other examples) and/or other arrangements of protrusions/recesses. In other examples, the locating mechanism may use different textured surfaces. For example, it may comprise sticky/rough sections and smooth sections, such that a game piece placed in/on the storage and charging device will tend to end up on the sticky/rough section and slide over the smooth sections.

In further examples, the locating mechanism may comprise visual features in addition to, or instead of, tactile features as described above and shown in FIG. 4. For example, the locating mechanism may comprise visual representations of game pieces which encourages (or causes) the user to manually place pieces in the correct position(s) within the charging and storage device.

Although the third and sixth examples 43, 46 show the stacking of identically shaped game pieces, in various examples, game pieces having different shapes may be stacked on top of each other within the storage and charging device, e.g. where the game pieces are shaped to resemble their corresponding virtual entity in the interactive software experience. In an example, a game piece shaped like an item of furniture (e.g. a chair or sofa) may be placed first onto the locating mechanism and then a game piece shaped like a character (e.g. human or animal) may be placed on top. The interactive software experience may then reflect this arrangement of game pieces and show (in the GUI) the character sitting on the item of furniture.

The recess/aperture/protrusion in a game piece which is used to position the game piece on the locating mechanism in the storage and charging device may be a feature of the game piece which is solely used for this purpose. In other examples, however, the recess/aperture/protrusion may also be used for other purposes, e.g. to connect game pieces together when they are not in the storage and charging device.

Figure 5:
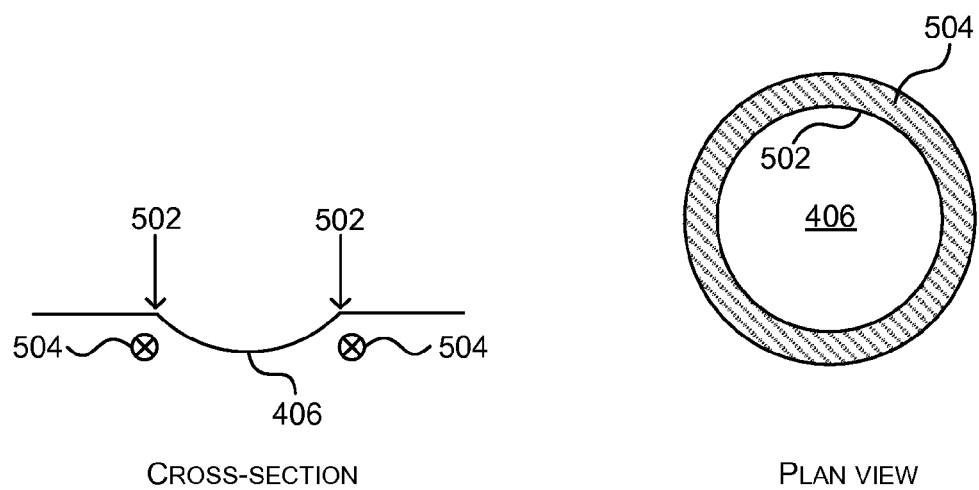
FIG. 5 shows schematic diagrams of an example locating and charging mechanism within a storage and charging device.

In various examples the locating mechanism may be integrated with the charging mechanism. For example, one or more of the pegs 402 in the first example 41 may incorporate an electrical contact which connects to an electrical contact within the recess/aperture on a game piece 404. Alternatively, one or more of the pegs 402 may contain a primary coil for inductive charging of a game piece 404 comprising a secondary coil. Referring to the second example 42 in FIG. 4, there may be primary coils for inductive charging around or underneath one or more of the recesses 406 and this is shown in FIG. 5. FIG. 5 shows a cross-section view and plan view of a single recess 406 with the edge of the recess labelled with arrows 502. The primary coil 504 surrounds the edge 502 of the recess 406. Electrical contacts/coils may similarly be integrated with any of the other examples 43-47 shown in FIG. 4.

Any contact/connector/coil within a game piece that is used for charging by the storage and charging device may be a dedicated contact/connector/coil used only for charging (and in some examples for charging and powering). In other examples, however, the contact/connector/coil within a game piece may also be used for other purposes, e.g. for providing power from the game piece to another game piece when the game pieces are not in the storage and charging device. In such an example, the contact/connector/coil (and associated circuitry) within a game piece may operate bi-directionally such that when in the storage and charging device and connected to the locating mechanism it receives energy which charges an internal battery (or other energy storage device) and when not connected to the locating mechanism but instead connected to another game piece, it provides energy (from the internal battery) to charge or power the connected game piece.

Inductive charging may also be used in a storage and charging device which does not comprise a locating or other alignment mechanism. In such a device, the game pieces may be located anywhere within/on the storage and charging device (i.e. their position and/or orientation is not predefined by a locating mechanism). In order to accommodate this, the charging mechanism 104 may comprise a plurality of charging coils (e.g. a ball of coils or 2D grid of coils) which may be selectively switched on in order to charge game pieces irrespective of their orientation and position within the storage and charging device. The switching on of coils may be controlled based on the sensed orientation and/or position of game pieces within/on the storage and charging device. In various examples, beamforming techniques may be used to manipulate the electromagnetic field to effect charging of a game piece.

Figure 6:
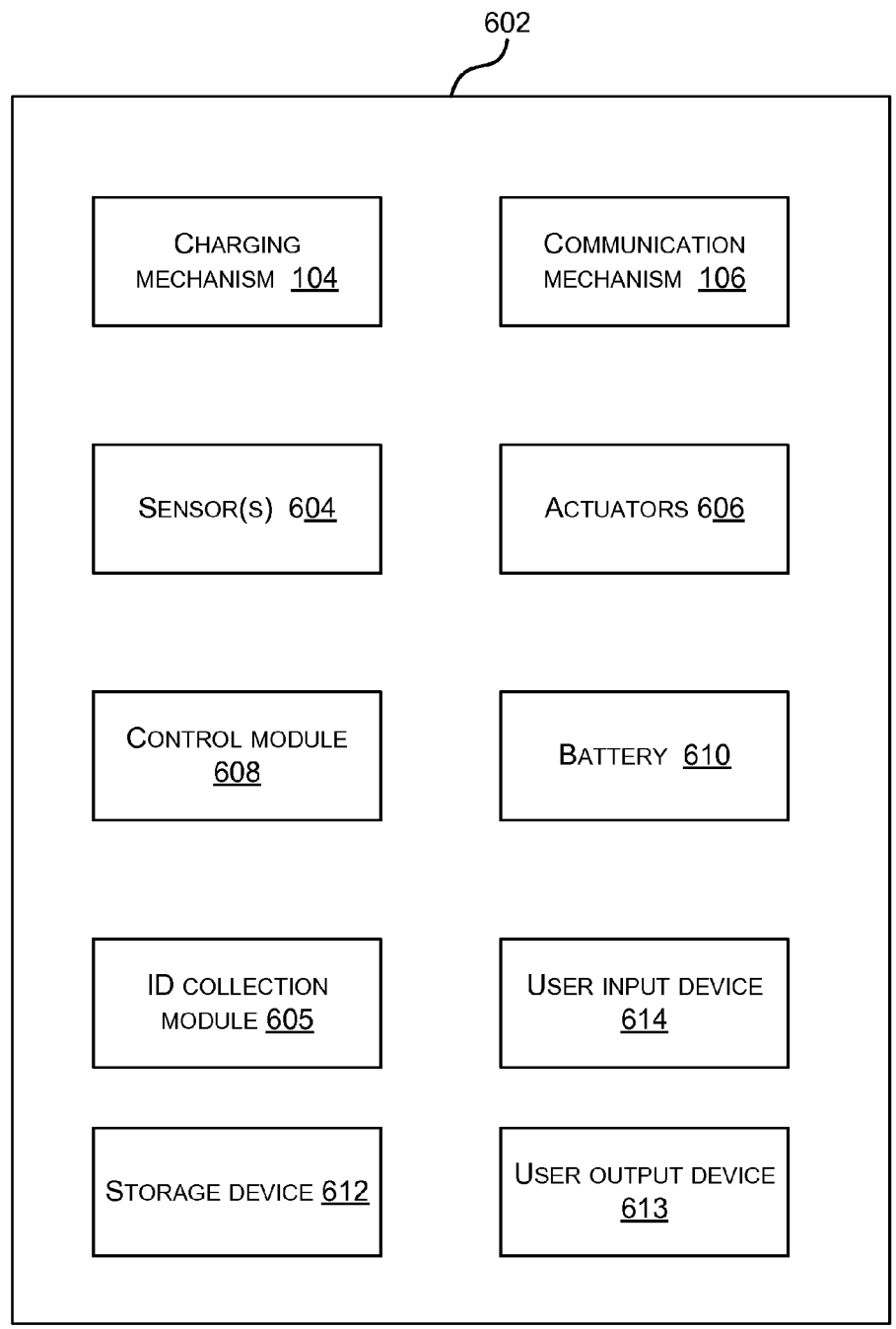
FIG. 6 is a schematic diagram of another example storage and charging device.

FIG. 6 is a schematic diagram of another example storage and charging device 602. The storage and charging device 602 shown in FIG. 6 comprises a number of optional elements 604-614 in addition to the charging mechanism 104 and communication mechanism 106 described above and shown in FIG. 1. It will be appreciated that although FIG. 6 shows a device 602 comprising all of the optional elements 604-614, a storage and charging device may not comprise any optional elements (as shown in FIG. 1) or may comprise any combination of one or more optional elements selected from those shown in FIG. 6. A storage and charging device may also comprise elements not shown in FIG. 6.

A storage and charging device for game pieces as described herein may further comprise one or more sensors 604. The sensor(s) 604 may, for example, be used to detect the presence, location, orientation and/or status of game pieces in/on the storage and charging device (e.g. temperature, light emitted, battery level, etc.) and in various examples the sensor(s) may be integrated with the charging and/or locating mechanism. For example, where the storage and charging device does not comprise a locating mechanism, sensors may be used to detect the location of game pieces and hence determine which charging coils are used to charge the game piece or the charging coils may themselves be used as a sensor to determine which charging coils to use for charging. In addition, or instead, sensor(s) 604 may be used to detect the configuration of the storage and charging device itself (e.g. is it open/closed, is it being touched by a user, etc.) or its environment (e.g. temperature, location, orientation, relative location of nearby devices such as other charging and storage devices or game pieces, relative location of TV, computers or other devices which may be used by the interactive software experience, the user's location and inputs from the user when they may be far, etc.) and this is further described below in relation to modular storage and charging devices.

Any suitable sensor technology may be used and examples include pressure sensors, Hall Effect sensors (to detect the orientation of a game piece), optical sensors (e.g. using a bands of color within a recess in a game piece and an optical sensor in the corresponding peg to determine which color is visible, from which the orientation of the game piece on the peg can be determined), capacitive sensors, beam-break sensors, push-switches, use of the inductive coils to sense if there is a game piece there (due to the current drawn changing when there is a receiving coil), etc.

Where a sensor is used to detect the presence of a game piece, in some examples the sensor may detect only whether there are any game pieces in/on the storage and charging device (e.g. is the device empty or not). In another example, sensor(s) may be used to detect how many game pieces are in/on the storage device and/or whether a game piece (i.e. any game piece) is located on a particular peg/post or in a particular recess within or on the storage and charging device and this may, for example, be used to activate/deactivate charging for that location (and hence may reduce the power consumption of the charging and storage device). In other examples, however, the sensor may detect which game piece is located on a particular peg/post or in a particular recess within or on the storage and charging device. This may, for example, be achieved by detecting the ID of a game piece that is within or on the storage and charging device and located on a particular peg/post or in a particular recess and hence the sensor may form part of the ID collection module 605 (described above).

As described above, the sensor data indicating the presence, location, orientation and/or status of a game piece may be communicated to the interactive software experience and used to affect the operation of the interactive software experience. In various examples, the sensor data indicating the configuration and/or environment of the storage and charging device may be communicated to the interactive software experience and used to affect the operation of the interactive software experience (e.g. the state of virtual entities associated with game pieces in the storage and charging device may change dependent upon whether the device is open or closed, the GUI may change to reflect the detected environment around the storage and charging device, etc.).

A storage and charging device for game pieces as described herein may further comprise one or more actuators 606 (e.g. solenoids, piezo-electric devices, Peltier devices, motos, servoes, muscle wire, light emitting devices, sonic or ultrasonic actuators, magnetic actuators, etc.). The actuators 606 may, for example, be used to rotate or otherwise move a game piece, eject a game piece from the storage and charging device, change the temperature of a game piece (e.g. warm up/cool down a game piece), light up a game piece, provide game effects (e.g. such that a game piece moves when the corresponding virtual entity is moving/talking), indicate the charging status of a game piece, etc.

A storage and charging device for game pieces as described herein may further comprise a control module 608 arranged to control the collection of IDs, sensor data and/or other data from game pieces. In addition, or instead, the control module 608 may control the charging of game pieces (as described above) and provide input to the charging mechanism 104. The control module 608 may control any actuators 606 which are provided.

In various examples the control module 608 may comprise one or more processors which may be microprocessors, controllers or any other suitable type of processors for processing computer executable instructions to control the operation of the storage and charging device as described herein (e.g. to control the collection of IDs, sensor data and/or other data from game pieces and/or to control the charging of game pieces). In some examples, for example where a system on a chip architecture is used, the processor(s) may include one or more fixed function blocks (also referred to as accelerators) which implement a part of the method of controlling the storage and charging device in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

A storage and charging device for game pieces as described herein may further comprise a battery 610. This battery 610 may be used to provide power to the storage and charging device itself and used for charging game pieces (via the charging mechanism 104) when the storage and charging device is not connected to an external electrical power source (e.g. a mains electricity connection). Where the storage and charging device comprises a battery 610, this enables the storage and charging device to be used when travelling and during power outages. Where provided, the battery 610 is of a significantly higher capacity than the battery within an individual game piece.

A storage and charging device for game pieces as described herein may further comprise a data storage device 612, such as a memory device. The data storage device 612 may be used to store data (e.g. IDs and other data) which is collected from game pieces which are in the storage and charging device. The data storage device 612 may, in addition or instead, be used to store data about the storage and charging device (as described above).

The data storage device 612 may comprise volatile or non-volatile, removable or non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, data storage media does not include communication media. Therefore, a data storage medium should not be interpreted to be a propagating signal per se. Propagated signals may be present in a data storage media, but propagated signals per se are not examples of data storage media. Although the data storage device 612 is shown within the storage and charging device 602 it will be appreciated that the storage may be distributed or located remotely and accessed via a network or other communication link (e.g. using communication mechanism 106).

A storage and charging device for game pieces as described herein may further comprise a user output device 613 which may provide status information and/or a user interface for the interactive software experience. This may, for example, be a display device (e.g. screen or projector) which is used to indicate which game pieces are currently in the storage and charging device, which game pieces are currently being charged and/or the status of game pieces or their corresponding virtual entities in the interactive software experience. In other examples, the user output device may be a speaker.

A storage and charging device for game pieces as described herein may further comprise a user input device 614. In some examples the user input device 614 may detect voice input, user gestures or other user actions and may provide a natural user interface (NUI). This user input may be used to configure the storage and charging device 602. In an embodiment the user output device 613 may also act as the user input device 614 if it is a touch sensitive display device.

Any of the user output device 613 and the user input device 614 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Figure 7:
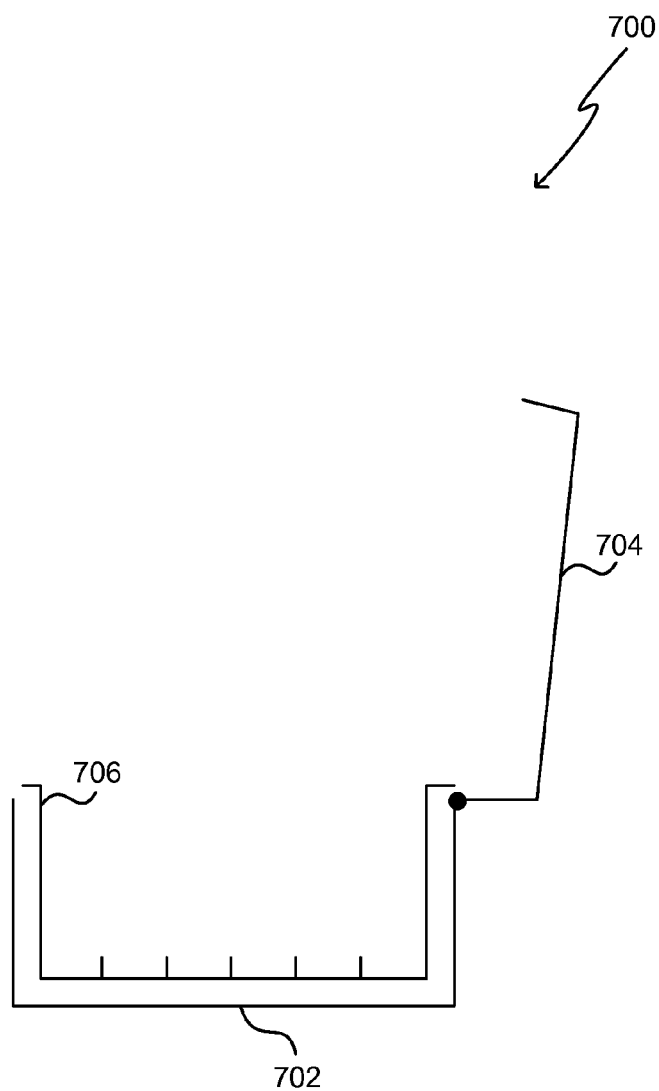
FIG. 7 is a schematic diagram of a storage and charging device comprising interchangeable insert pieces.

In various examples, the storage and charging device described herein may have a modular construction in that it is formed from multiple modules which are connected together. In various examples, the modular construction may comprise an outer housing or shell and insert piece(s). One example of this is shown in FIG. 7 which shows a storage and charging device 700 comprising an outer housing (formed from a base part 702 and a lid part 704) and an insert piece 706. By changing the insert piece 706 (but using the same outer housing), a user (or another person such as the manufacturer or retailer) may be able to change the physical appearance of the storage and charging device, e.g. from resembling a super-hero lair to looking like a royal palace. This change in physical appearance may also be mirrored in the interactive software experience in response to receiving a data from the storage and charging device identifying the current insert piece being used. The mirroring may be the result of changing the appearance of the virtual entity corresponding to the storage and charging device based on the current insert piece or changing which virtual entity corresponds to the storage and charging device based on the current insert piece. In an example, the insert piece 706 may have an ID which is collected by an ID collection module 605 and transmitted to the interactive software experience. In another example, the identity of the current insert piece may be sensed (by a sensor 604) in another way.

In addition to, or instead of, changing the appearance of the storage and charging device by changing the insert piece, a user (or another person such as the manufacturer or retailer) may be able to change the locating mechanism in the storage and charging device by changing the insert piece. For example, a first insert piece may be configured to receive a first type of game piece using a first locating mechanism and a second insert piece may be configured to receive a second type of game piece using a second locating mechanism. The different inserts may, for example, provide different shapes/sizes of pegs, recesses and/or posts.

The use of an insert piece as shown in FIG. 7 enables customization of the storage and charging device and/or the addition of sensors, actuators, user inputs/outputs, etc.

Figure 8:
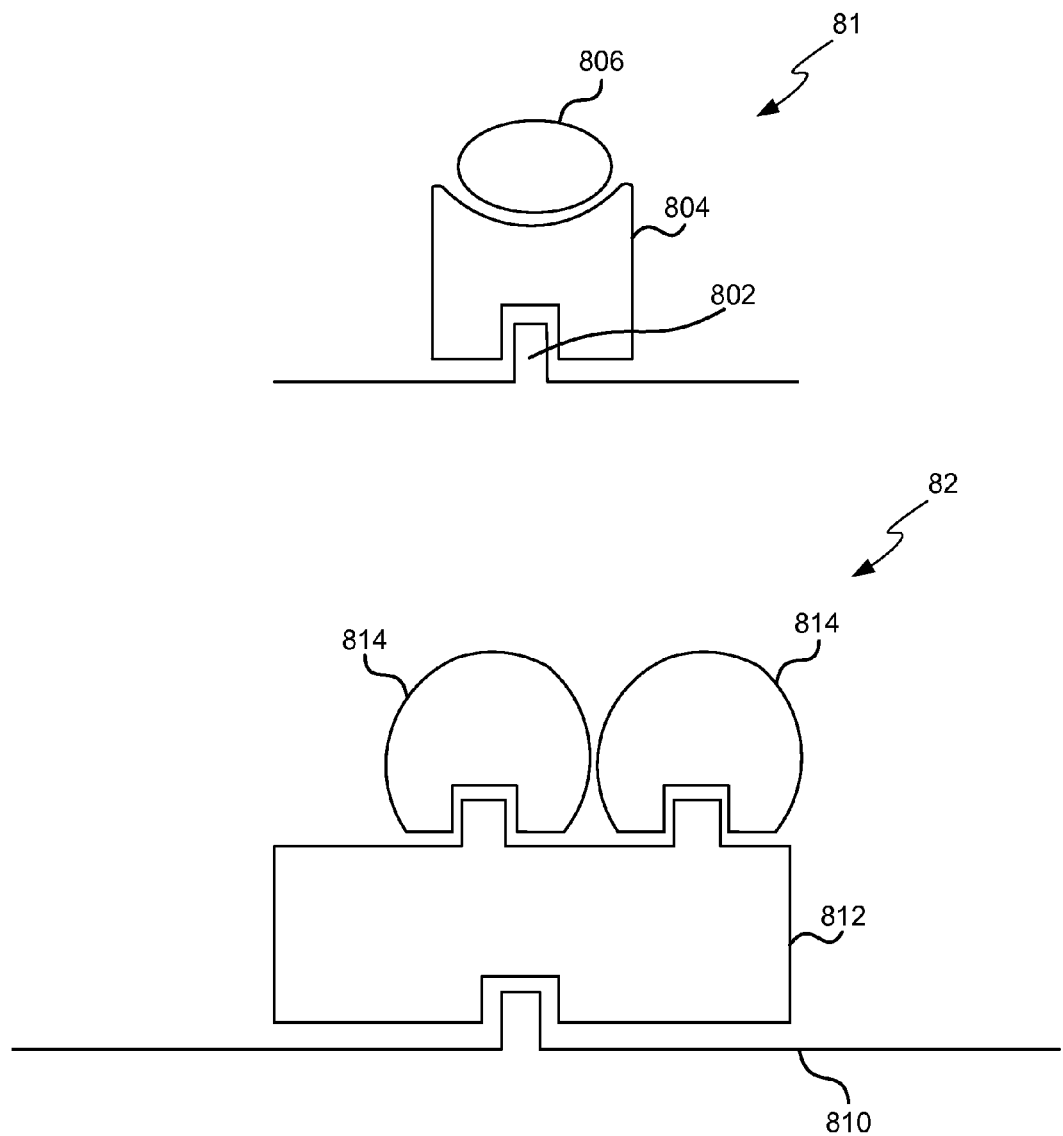
FIG. 8 shows schematic diagrams of various locating mechanisms within a storage and charging device.

In addition to, or instead of, using different inserts to change the locating mechanism, spacer pieces may be used to change the locating mechanism, as shown in FIG. 8. FIG. 8 shows two examples 81, 82 and in the first example 81, a spacer piece 804 is used to modify the locating mechanism from a peg 802 to a recess which can accommodate game piece 806. In the second example, the type of locating mechanism is not changed (as is the case in the first example), but instead, the spacer piece 812 acts to modify a single peg (in the original locating mechanism 810) to provide two pegs to receive two game pieces 814.

The above description refers to game pieces in general; however, in various examples the game pieces may comprise parts of a wearable or fashion item. In various examples, the game pieces may comprise smart beads and a connecting element (or band) onto which the smart beads can be connected (e.g. threaded on, clipped on, etc.). In such an example, the exterior of the storage and charging device may resemble a jewelry box and in various examples, the interior of the storage and charging device may resemble a play environment (e.g. dolls house, castle, etc.) and this may be changeable through the use of inserts (as described above with reference to FIG. 7).

Figure 9:
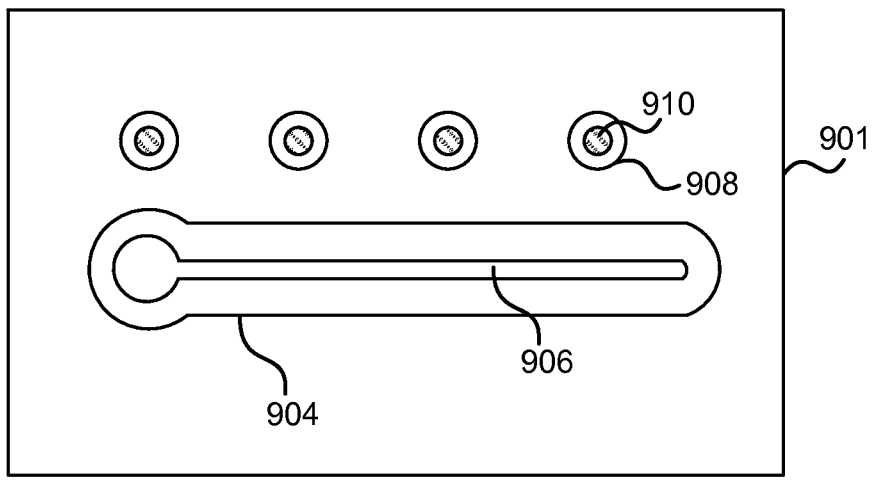
FIG. 9 shows schematic diagrams of further example storage and charging devices.
Figure 9:
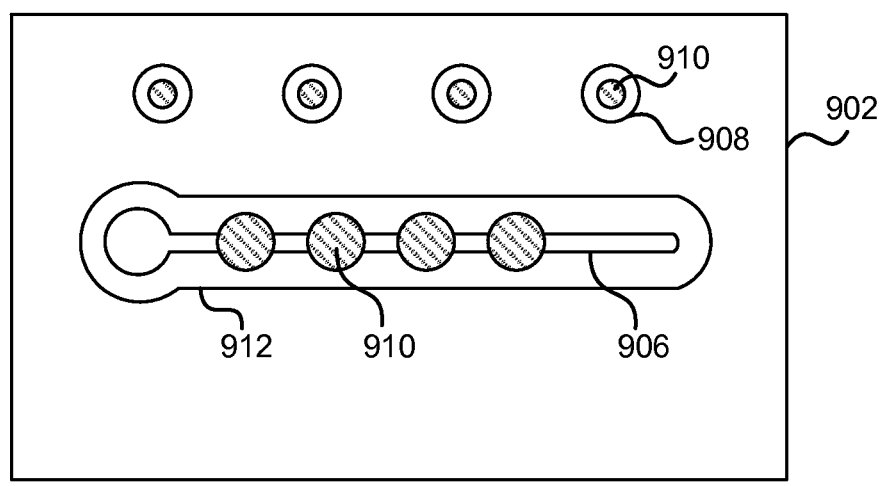

FIG. 9 shows schematic diagrams of two example storage and charging devices 901-902 for game pieces where the game pieces are a fashion item, or parts thereof. In the examples shown in FIG. 9 the fashion item comprises two or more smart beads on a connecting element (e.g. a bracelet). In other examples, however, the game pieces may be another fashion item (or parts thereof), and the term 'fashion item' is used herein to refer to both wearable items (e.g. items of jewelry) or non-wearable items (e.g. a phone charm). Examples of fashion items include, but are not limited to, phone charms, earrings, rings or hairbands, belts, watches, purses or bags (where the beads may, for example, be on the strap or the body of the item), glasses, shoe accessories, brooches, other hair accessories, other phone accessories, masks, hats, scarves, key chains and other items of clothing.

The first example storage and charging device 901 comprises a recess 904 for the connecting element 906 and when located in the recess 904, the connecting element 906 is charged by the storage and charging device 901. In some examples, the storage and charging device 901 may also comprise one or more recesses 908 for smart beads 910. These recesses 908 may include some in which the beads are charged and/or powered and/or some in which the beads are not charged or powered. In one example, only the connecting element 906 is charged by the storage and charging device 901 (and any beads in the storage and charging device 901 are not charged).

The second example storage and charging device 902 is arranged to be able charge the connecting element 906 when one or more smart beads 910 are connected to (e.g. threaded onto) the connecting element 906. As shown in FIG. 9, the recess 912 is therefore shaped to receive the connecting element 906 and one or more smart beads 910. In various examples, the storage and charging device 902 may also charge one or more of the smart beads 910 when they are connected to the connecting element 906. In some examples, the storage and charging device 902 may also comprise one or more recesses 908 for smart beads 910. These recesses 908 may include some in which the beads are charged and/or powered and/or some in which the beads are not charged or powered. In one example, only the connecting element 906 and any beads connected to the connecting element are charged by the storage and charging device 902 (any other beads in the storage and charging device 902 which are not on the connecting element 906 are not charged).

Although the example shown in FIG. 9 all show locating mechanisms which comprise one or more recesses, it will be appreciated that in other examples different locating mechanisms may be used (e.g. pegs/posts/apertures, etc.). The locating mechanism for smart beads which are not connected to the connecting element 906 may use the same connecting arrangement (e.g. aperture, recess) as is used to connect the smart bead to the connecting element or alternatively a different connecting arrangement may be provided (e.g. an aperture may be provided to thread the smart beads onto the connecting element and a recess may be provided so that the smart beads can sit on pegs in the storage and charging device).

Figure 10:
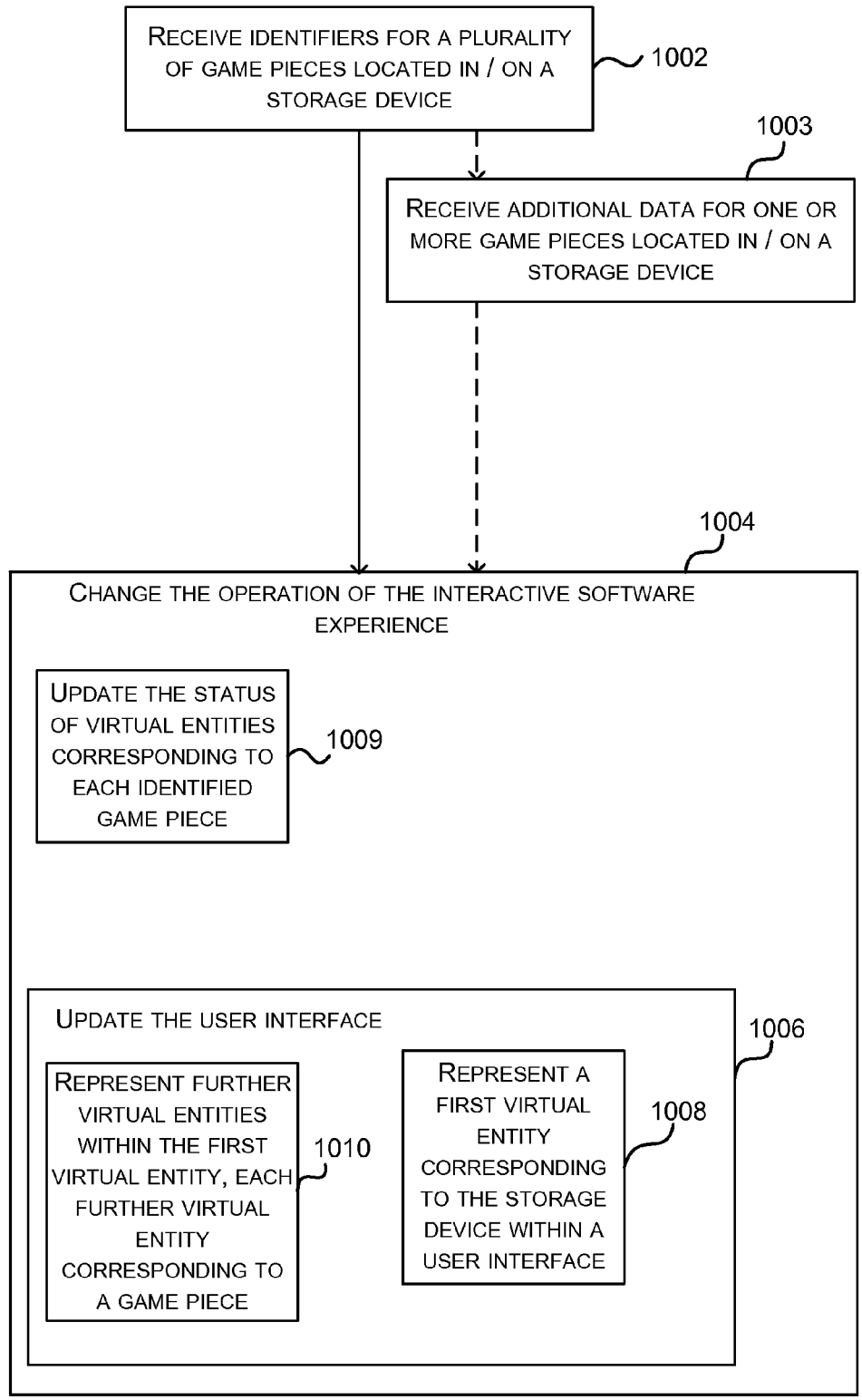
FIG. 10 is a flow diagram showing example methods of operation of an interactive software experience.

FIG. 10 is a flow diagram showing example methods of operation of the interactive software experience 108. The interactive software experience receives the IDs of one or more game pieces which are in/on the storage device 102 (block 1002). As described above, in various examples, the interactive software experience may also receive additional data for one or more game pieces (block 1003), e.g. location/orientation data, sensor data, etc. In response to receiving the IDs (and in some examples, the additional data), the interactive software experience changes its operation (block 1004). This may involve changing the UI (block 1006), updating the status of virtual entities associated with the received IDs (block 1009), etc. Where the UI is updated (in block 1006), this may, for example, comprise representing a first virtual entity within the UI (which may be a GUI), where the first virtual entity corresponds to the storage and charging device (block 1008). In addition, it may comprise representing further virtual entities within the first virtual entity (block 1010), where each further virtual entity corresponds to one of the IDs received (e.g. as shown in FIG. 3 and described above).

In various examples, the operation of the interactive software experience may change in different ways depending on whether a game piece is charging or not. For example, if the interactive software experience comprises a virtual village, then the presence of pieces in/on the storage and charging device may cause the interactive software experience to show virtual characters related to those pieces in the village inn (which is the entity to which the storage and charging device corresponds), where they may be eating (if charging) or sleeping (if not charging). The interactive software experience may also show other pieces which are currently not in/on the storage and charging device, e.g. those pieces which are being worn by the user may be depicted as outside the inn, perhaps performing some game tasks.

In a further example, the pieces which are depicted as eating or sleeping may be gaining in-game benefits which are regenerative in nature, e.g. heath points being restored or hunger attribute decreasing. In other words, the storage and charging piece's function in the real world can be analogously represented in the game, to maximize the parallels between the game world and the real world.

In various examples, when a real-world device needs charging, the virtual in-game representation can be made by the game to require in-game restorative behaviors. This means that the overhead of charging devices is hidden from the user since they perceive there to be an in-game requirement or benefit from performing this otherwise tedious task.

Although the present examples are described and illustrated herein as being implemented in a system as shown in FIG. 1, the system described is provided as an example and not a limitation. As those skilled in the art will appreciate, the present examples are suitable for application in a variety of different types of computer systems and the storage and charging device described herein may communicate with the interactive software experience via any means.

In an example, a storage device for a plurality of game pieces is associated with an interactive software experience. The storage device corresponds to a virtual entity within the interactive software experience and comprises: a charging mechanism arranged to charge at least one of the game pieces; and a communication mechanism arranged to communicate with the interactive software experience.

In an example, a storage device for a plurality of game pieces is associated with an interactive software experience. The storage device corresponds to a virtual entity within the interactive software experience and comprises: means for charging at least one of the game pieces; and means for communicating with the interactive software experience.

The storage device may further comprise a locating mechanism arranged to predefine a plurality of positions within, on or against the storage device for placement of game pieces by a user. The locating mechanism may comprise a plurality of recesses and/or protrusions for receiving game pieces.

The storage device may further comprise means for defining a plurality of positions within the storage device for placement of game pieces by a user, for example using one or more recesses or protrusions.

The storage device may further comprise an ID collection module arranged to collect IDs of one or more game pieces which are in or on the storage device, and the communication module may be arranged to transmit the IDs of the game pieces to the interactive software experience. The IDs may be transmitted to the interactive software experience via an intermediary device and in various examples, the intermediary device is a game piece in the storage device.

The plurality of game pieces may be parts of one or more wearable devices and in various examples, the plurality of game pieces comprise one or more smart beads and one or more connecting elements (to which smart beads may be attached). In various examples, charging mechanism may be arranged to charge only a connecting element. In other examples, the charging mechanism may be arranged to charge a connecting element and any smart beads attached to the connecting element.

The storage device may further comprise one or more sensors arranged to detect an orientation of one or more of the plurality of game pieces in the storage device.

The storage device may further comprise one or more sensors arranged to detect whether the storage device is open or closed and the communication element may be arranged to communicate data identifying if the storage device is open or closed to the interactive software experience.

The storage device may further comprise a module for detecting an identity of a removable insert when placed inside the storage device and the communication element may be arranged, in response to detecting a removable insert, to communicate the identity of the removable insert to the interactive software experience to trigger a change in the virtual entity to which the storage device corresponds (e.g. a change in the appearance of the virtual entity or a change to another virtual entity).

In various examples, the plurality of game pieces are associated with a first interactive software experience when outside of the storage device and a second interactive software experience when in the storage device, and the communication mechanism in the storage device is arranged to communicate with the second interactive software experience and the storage device corresponds to a virtual entity within the second interactive software experience.

The storage device may further comprise an aligning mechanism arranged to align the game pieces into a predefined orientation within the storage device.

The storage device may further comprise means for aligning the game pieces into a predefined orientation within the storage device.

In an example, a method comprises: collecting identifiers for one or more game pieces in a storage device, the game pieces being associated with an interactive software experience; and transmitting the identifiers to a computing device running the interactive software experience.

The identifiers may be collected by the storage device and transmitted to the computing device via an intermediary device. Alternatively, the identifiers may be collected by an intermediary device and the method may further comprise: receiving, at the intermediary device, an identifier for the storage device; and transmitting the identifier for the storage device to the computing device running the interactive software experience.

In an example, a method comprises: receiving, at an interactive software experience, identifiers for a plurality of game pieces located in or on a storage device, the storage device corresponding to a first virtual entity in the interactive software experience; representing the first virtual entity within a user interface of the interactive software experience; and representing further virtual entities within the first virtual entity in the user interface, each of the further virtual entities corresponding to a different one of the plurality of game pieces located in or on the storage device.

The method may further comprise receiving game piece location data at the interactive software experience, the game piece location data identifying a location of each of the plurality of game pieces within or on the storage device, and wherein the further virtual entities are represented within the user interface at positions within the first virtual entity based on the game piece location data.

In various examples, the interactive software experience is a computer game.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A storage device for a plurality of game pieces associated with an interactive software experience, the storage device comprising:
   a charging mechanism arranged to charge at least one of the game pieces; and
   a communication mechanism arranged to communicate with the interactive software experience, wherein the storage device corresponds to a virtual entity within the interactive software experience,
   an ID collection module arranged to collect IDs of one or more game pieces which are in or on the storage device, and wherein the communication module is arranged to transmit the IDs to the interactive software experience,
wherein the communication mechanism is arranged to transmit the IDs to the interactive software experience via an intermediary device, and
wherein the intermediary device is a game piece in the storage device.

2. The storage device according to claim 1, further comprising:
a locating mechanism arranged to predefine a plurality of positions within, on or against the storage device for placement of game pieces by a user.

3. The storage device according to claim 2, wherein the locating mechanism comprises a plurality of recesses for receiving game pieces or a plurality of protrusions for receiving game pieces.

4. The storage device according to claim 1, wherein the plurality of game pieces are parts of one or more wearable devices.

5. The storage device according to claim 4, wherein the plurality of game pieces comprise one or more smart beads and one or more connecting elements.

6. The storage device according to claim 5, wherein the charging mechanism is arranged to charge only a connecting element, or is arranged to charge a connecting element and any smart beads attached to the connecting element.

7. The storage device according to claim 1, further comprising one or more sensors arranged to detect an orientation of one or more of the plurality of game pieces in the storage device.

8. The storage device according to claim 1, further comprising one or more sensors arranged to detect whether the storage device is open or closed and wherein the communication element is arranged to communicate data identifying if the storage device is open or closed to the interactive software experience.

9. The storage device according to claim 1, further comprising a module for detecting an identity of a removable insert when placed inside the storage device and wherein the communication element is arranged, in response to detecting a removable insert, to communicate the identity of the removable insert to the interactive software experience to trigger a change in the virtual entity to which the storage device corresponds.

10. The storage device according to claim 1, wherein the plurality of game pieces are associated with a first interactive software experience when outside of the storage device and a second interactive software experience when in the storage device and wherein the communication mechanism is arranged to communicate with the second interactive software experience and the storage device corresponds to a virtual entity within the second interactive software experience.

11. A storage device for a plurality of game pieces associated with an interactive software experience, the storage device comprising:
a charging mechanism arranged to charge at least one of the game pieces;
a communication mechanism arranged to communicate with the interactive software experience, wherein the storage device corresponds to a virtual entity within the interactive software experience; and
one or more sensors arranged to detect whether the storage device is open or closed and wherein the communication mechanism is arranged to communicate data identifying if the storage device is open or closed to the interactive software experience.

12. The storage device according to claim 11, further comprising:
a locating mechanism arranged to predefine a plurality of positions within, on or against the storage device for placement of game pieces by a user.

13. The storage device according to claim 12, wherein the locating mechanism comprises a plurality of recesses for receiving game pieces, or a plurality of protrusions for receiving game pieces.

14. The storage device according to claim 11, further comprising an ID collection module arranged to collect IDs of one or more game pieces which are in or on the storage device, and wherein the communication mechanism is arranged to transmit the IDs to the interactive software experience.

15. The storage device according to claim 14, wherein the communication mechanism is arranged to transmit the IDs to the interactive software experience via an intermediary device.

16. The storage device according to claim 15, wherein the intermediary device is a game piece in the storage device.

17. The storage device according to claim 11, wherein the plurality of game pieces are parts of one or more wearable devices.

18. The storage device according to claim 17, wherein the plurality of game pieces comprise one or more smart beads and one or more connecting elements.

19. The storage device according to claim 18, wherein the charging mechanism is arranged to charge only a connecting element, or wherein the charging mechanism is arranged to charge a connecting element and any smart beads attached to the connecting element.

20. The storage device according to claim 11, further comprising one or more sensors arranged to detect an orientation of one or more of the plurality of game pieces in the storage device.

21. The storage device according to claim 11, further comprising a module for detecting an identity of a removable insert when placed inside the storage device and wherein the communication mechanism is arranged, in response to detecting a removable insert, to communicate the identity of the removable insert to the interactive software experience to trigger a change in the virtual entity to which the storage device corresponds.

22. The storage device according to claim 11, wherein the plurality of game pieces are associated with a first interactive software experience when outside of the storage device and a second interactive software experience when in the storage device and wherein the communication mechanism is arranged to communicate with the second interactive software experience and the storage device corresponds to a virtual entity within the second interactive software experience.

23. A storage device for a plurality of game pieces associated with an interactive software experience, the storage device comprising:
a charging mechanism arranged to charge at least one of the game pieces; and
a communication mechanism arranged to communicate with the interactive software experience, wherein the storage device corresponds to a virtual entity within the interactive software experience,
wherein the plurality of game pieces are associated with a first interactive software experience when outside of the storage device and a second interactive software experience when in the storage device and wherein the communication mechanism is arranged to communicate with the second interactive software experience and the storage device corresponds to a virtual entity within the second interactive software experience.

24. The storage device according to claim 23, further comprising:
a locating mechanism arranged to predefine a plurality of positions within, on or against the storage device for placement of game pieces by a user.

25. The storage device according to claim 24, wherein the locating mechanism comprises a plurality of recesses for receiving game pieces, or a plurality of protrusions for receiving game pieces.

26. The storage device according to claim 23, further comprising an ID collection module arranged to collect IDs of one or more game pieces which are in or on the storage device, and wherein the communication module is arranged to transmit the IDs to the interactive software experience.

27. The storage device according to claim 26, wherein the communication module is arranged to transmit the IDs to the interactive software experience via an intermediary device.

28. The storage device according to claim 27, wherein the intermediary device is a game piece in the storage device.

29. The storage device according to claim 23, wherein the plurality of game pieces are parts of one or more wearable devices.

30. The storage device according to claim 29, wherein the plurality of game pieces comprise one or more smart beads and one or more connecting elements.

31. The storage device according to claim 30, wherein the charging mechanism is arranged to charge only a connecting element, or is arranged to charge a connecting element and any smart beads attached to the connecting element.

32. The storage device according to claim 23, further comprising one or more sensors arranged to detect an orientation of one or more of the plurality of game pieces in the storage device.

33. The storage device according to claim 23, further comprising one or more sensors arranged to detect whether the storage device is open or closed and wherein the communication mechanism is arranged to communicate data identifying if the storage device is open or closed to the interactive software experience.

34. The storage device according to claim 23, further comprising a module for detecting an identity of a removable insert when placed inside the storage device and wherein the communication mechanism is arranged, in response to detecting a removable insert, to communicate the identity of the removable insert to the interactive software experience to trigger a change in the virtual entity to which the storage device corresponds.

* * * * *